(12) United States Patent
Kwak et al.

(10) Patent No.: US 8,903,161 B2
(45) Date of Patent: Dec. 2, 2014

(54) APPARATUS FOR ESTIMATING ROBOT POSITION AND METHOD THEREOF

(71) Applicant: Samsung Electronics Co., Ltd., Suwon-si (KR)

(72) Inventors: No San Kwak, Suwon-si (KR); Kyung Shik Roh, Seongnam-si (KR); Sung Hwan Ahn, Seongnam-si (KR); Suk June Yoon, Seoul (KR); Seung Yong Hyung, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 95 days.

(21) Appl. No.: 13/723,540

(22) Filed: Dec. 21, 2012

(65) Prior Publication Data

US 2013/0163853 A1 Jun. 27, 2013

(30) Foreign Application Priority Data

Dec. 23, 2011 (KR) ........................ 10-2011-0140767

(51) Int. Cl.
*G06T 7/00* (2006.01)
(52) U.S. Cl.
CPC .................................... *G06T 7/0042* (2013.01)
USPC ............ 382/153; 382/154; 382/165; 382/201
(58) Field of Classification Search
None
See application file for complete search history.

(56) References Cited

U.S. PATENT DOCUMENTS

| 2002/0169537 | A1* | 11/2002 | Regensburger et al. ......... 701/96 |
| 2009/0067707 | A1* | 3/2009 | Sim et al. ....................... 382/154 |
| 2009/0201384 | A1* | 8/2009 | Kang et al. .................. 348/222.1 |
| 2011/0254841 | A1* | 10/2011 | Lim et al. ....................... 345/421 |
| 2012/0026296 | A1* | 2/2012 | Lee et al. ......................... 348/47 |
| 2012/0105594 | A1* | 5/2012 | You et al. ......................... 348/49 |
| 2012/0121131 | A1* | 5/2012 | Kim ............................... 382/103 |
| 2012/0146902 | A1* | 6/2012 | Adermann et al. ............ 345/158 |
| 2013/0107005 | A1* | 5/2013 | Lim et al. ......................... 348/46 |
| 2013/0147938 | A1* | 6/2013 | McCloskey et al. ............. 348/78 |

FOREIGN PATENT DOCUMENTS

| KR | 10-2011-0069923 | 6/2011 |
| KR | 10-2011-0097140 | 8/2011 |

* cited by examiner

*Primary Examiner* — Jon Chang
(74) *Attorney, Agent, or Firm* — Staas & Halsey LLP

(57) ABSTRACT

A method for estimating a location of a device uses a color image and a depth image. The method includes matching the color image to the depth image, generating a 3D reference image based on the matching, generating a 3D object image based on the matching, extracting a 2D reference feature point from the reference image, extracting a 2D reference feature point from the object image, matching the extracted reference feature point from the reference image to the extracted reference feature point from the object image, extracting a 3D feature point from the object image using the matched 2D reference feature point, and estimating the location of the device based on the extracted 3D feature point.

20 Claims, 12 Drawing Sheets

FIG. 9

| | NUMBER OF FEATURE POINT | NUMBER OF INLIER | POSITION | ERROR |
|---|---|---|---|---|
| CONVENTIONAL METHOD | 20 | 14 | TRANSLATION (UNIT m): (6.26, -23.58, 2.31) ROTATION (quaternion): (0.0166, -0.8036, 0.5947, -0.0140) | TRANSLATION: (0.26, -0.58, 1.06) |
| SUGGESTED METHOD | 180 | 128 | TRANSLATION (UNIT m): (5.97, -23, 1.18) ROTATION (quaternion): (0.0280, -0.7805, 0.7067, -0.0438) | TRANSLATION: (-0.03, 0, -0.07) | ns
APPARATUS FOR ESTIMATING ROBOT POSITION AND METHOD THEREOF

CROSS-REFERENCE TO RELATED APPLICATIONS

This application claims the priority benefit of Korean Patent Application No. 10-2011-0140767, filed on Dec. 23, 2011 in the Korean Intellectual Property Office, the disclosure of which is incorporated herein by reference.

BACKGROUND

1. Field

The following description relates to an apparatus for estimating a position, or a location, of a device, such as a robot, for example, capable of calculating the position of the device by providing an additional feature point in addition to a reference feature point, and a method thereof.

2. Description of the Related Art

To recognize the position of a robot, various sensors have been used. With regard to an indoor environment, a large amount of research into robot position recognition has been conducted using ultrasonic sensors, infrared sensors, wireless signals, and cameras.

Much research has been conducted using cameras among the various sensors for the benefit of cost and effectiveness, mainly using including a stereo camera, simulating human binocular vision, and a single camera.

Using the camera may significantly reduce the cost in the robot position recognition, but cause a difficulty in matching feature points and calculating a three-dimensional position of a feature point.

Therefore, conventional research has been focused on achieving a robust matching of feature points. In order to calculate the position of the robot, the feature points need to be recognized even when an image is viewed from different directions and different distances, so the feature point matching is important.

If a sufficient amount of feature point matching is achieved, the position of the robot is calculated by mathematical formulas. However, an indoor wall surface lacks feature points, so the number of matched feature points is small and the calculation of the position of the robot is difficult.

Even if calculated using the mathematical formula, the calculation of the position of the robot based on a small amount of matched feature points may produce a wrong result.

That is, in estimating the position of the robot an indoor environment, the number of feature points and the matching of feature points are an emerging issue.

SUMMARY

Therefore, it is an aspect of the present disclosure to provide an apparatus for estimating a position of a robot capable of extracting additional feature points adjacent to a reference feature point in addition to the reference feature point, and a method thereof.

Additional aspects of the disclosure will be set forth in part in the description which follows and, in part, will be obvious from the description, or may be learned by practice of the disclosure.

In accordance with an aspect of the present disclosure, an apparatus for estimating a position of a robot includes an image acquisition unit, an image processing unit, and a position estimating unit. The image acquisition unit may be configured to acquire an RGB image and an infrared image having depth information, and sequentially generate a reference image serving as a reference to extract feature points and an object image that is to be compared with the reference image by matching the RGB image to the infrared image. The image processing unit may be configured to extract two-dimensional reference feature points from each of the reference image and the object image, match the reference feature points between the reference image and the object image, and extract at least one additional three-dimensional feature point from the two-dimensional reference feature points matched. The position estimating unit may be configured to estimate the position of the robot from the additional feature point and optimize the estimated position of the robot.

The additional feature point may be coordinate information that is located adjacent to the matched reference feature point, and have depth information.

The additional feature point may include four additional feature points or eight additional feature points extracted for each of the matched reference feature points.

The image processing unit may include a reference feature point extracting unit, a feature point matching unit, and an additional feature point extracting unit. The reference feature point extracting unit may be configured to extract the reference feature points from the reference image or the object image by use of a reference feature point extraction algorithm. The feature point matching unit may be configured to match the reference feature point of the reference image to the reference feature point of the object image so as to determine whether the reference feature point of the reference image is a same feature point as the reference feature point of the object image. The additional feature point extracting unit may be configured to extract at least one additional feature point located adjacent to the matched reference feature point from a three-dimensional image that is transmitted from the image acquisition unit.

The additional feature point extracting unit may include a determination unit configured to determine whether to extract the additional feature points, or to select the number of the additional feature points to be extracted.

The determination unit may determine whether to extract the additional feature points by comparing the number of the matched reference feature points with a first reference value.

The determination unit may select the number of the additional feature points to be extracted, by comparing the number of the matched reference feature points with a second reference value.

The position estimating unit may obtain a displacement of the robot in a three-dimensional space by use of the following mathematical formula:

$$\min_{R,d} \Sigma_{i=1}^{n} \|RX_i + d - Y_i\|^2.$$

In accordance with an aspect of the present disclosure, a method of estimating a position of a robot is as follows. An RGB image and an infrared image having depth information may be acquired. A reference image and an object image may be sequentially generated by matching the RGP image to the infrared image. The reference image may serve as a reference to extract feature points, and the object image may be compared with the reference image. Two-dimensional reference feature points may be extracted from each of the reference image and the object image. The reference feature points are matched between the reference image and the object image. At least one additional three-dimensional feature point may be extracted from the matched two-dimensional reference feature point to perform an image processing. The position of the robot may be estimated from the additional feature point, and the estimated position of the robot may be optimized.

The additional feature point may be coordinate information that is located adjacent to the matched reference feature point, and have depth information.

The additional feature point may include four additional feature points or eight additional feature points extracted for each of the matched reference feature points.

The performing of image processing is as follows. The reference feature points may be extracted from the reference image or the object image by use of a reference feature point extraction algorithm. Whether the reference feature point of the reference image is a same feature point as the reference feature point of the object image may be determined by matching the reference feature point of the reference image to the reference feature point of the object image. At least one additional feature point located adjacent to the matched reference feature point may be extracted from a three-dimensional image that is transmitted from an image acquisition unit.

The extracting of the additional feature point is as follows. A determination of whether to extract the additional feature point, or of selecting the number of the additional feature points to be extracted may be performed.

The performing of the determination may include comparing the number of the matched reference feature points with a first reference value.

The performing of the determination may include comparing the number of the matched reference feature points with a second reference value.

The estimating of the position of the robot may include obtaining a displacement of the robot in a three-dimensional space by use of the following mathematical formula:

$$\min_{R,d}\Sigma_{i=1}^{n}\|RX_i+d-Y_i\|^2.$$

In accordance with an aspect of the present disclosure, a method may include receiving a color image and a depth image, matching the color image to the depth image, generating a 3D reference image based on the matched image, generating a 3D object image based on the matched image, extracting a 2D reference feature point from the reference image, extracting a 2D reference feature point from the object image, matching the extracted reference feature point from the reference image to the extracted reference feature point from the object image, extracting a 3D feature point from the object image using the matched 2D reference feature point, and estimating the location of the device based on the extracted 3D feature point As described above, additional feature points in addition to a reference feature point are extracted, and the extracted additional feature points are used to calculate the position of the robot, thereby improving the stability on recognizing the position of the robot.

Furthermore, the time taken for extracting and processing the additional feature points falls in a range allowable for real-time position recognition, thereby estimating the position of the robot in real time.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 9 is a view showing the comparison result of the performance between the conventional position recognition method and the suggested method in accordance with an embodiment of the present disclosure.

DETAILED DESCRIPTION

Figure 1:
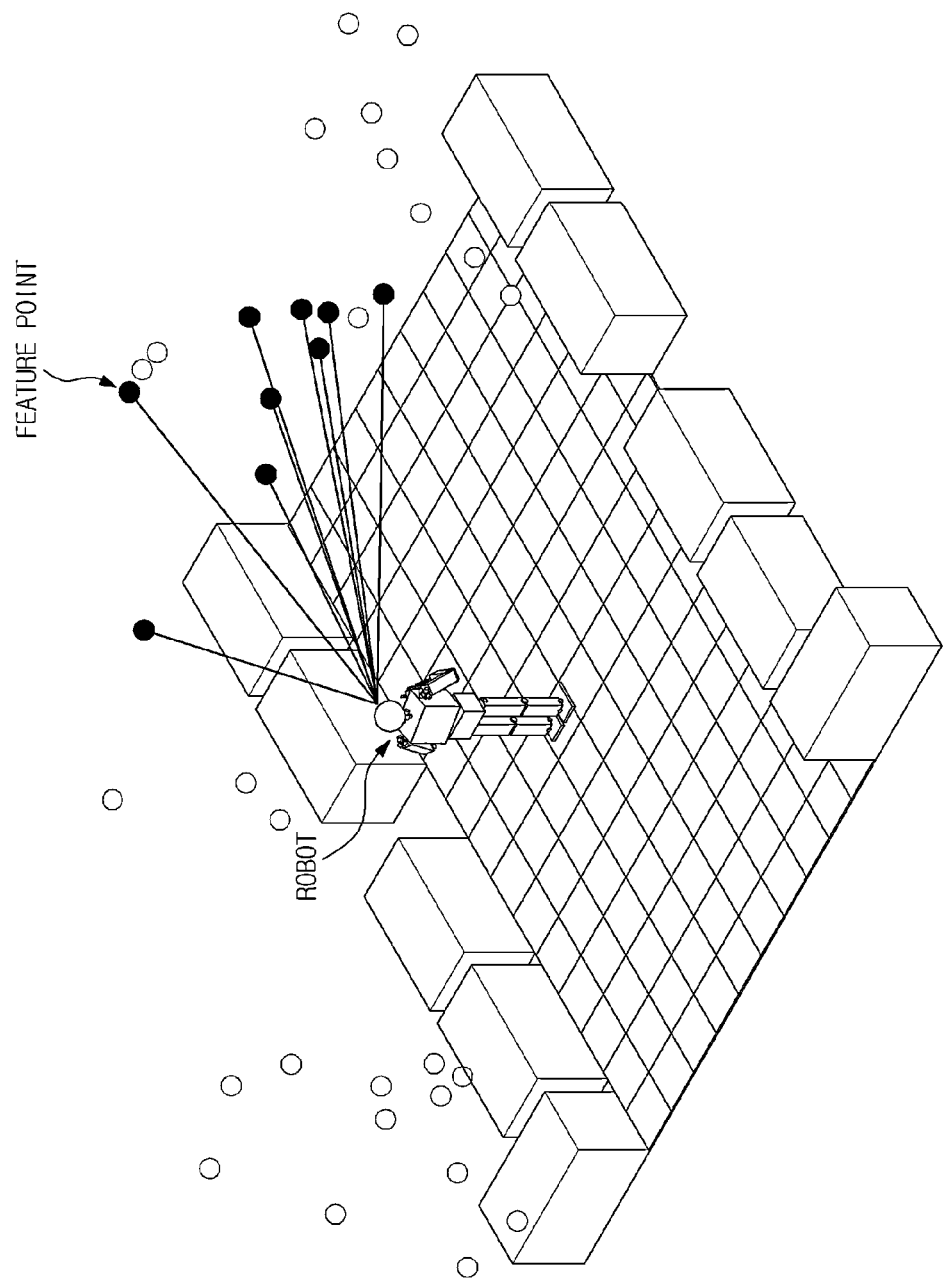
FIG. 1 is a view illustrating an example of a method of estimating the position of a robot at a robot position estimating apparatus in accordance with an embodiment of the present disclosure.

Reference will now be made in detail to the embodiments of the present disclosure, examples of which are illustrated in the accompanying drawings, wherein like reference numerals refer to like elements throughout.

FIG. 1 is a view illustrating an example of a method of estimating the position of a robot at a robot position estimating apparatus in accordance with an embodiment of the present disclosure.

Referring to FIG. 1, a robot position estimating apparatus 100 in accordance with the present disclosure is configured to estimate the position of the robot by recognizing a plurality of feature points adjacent to the robot.

Figure 2:
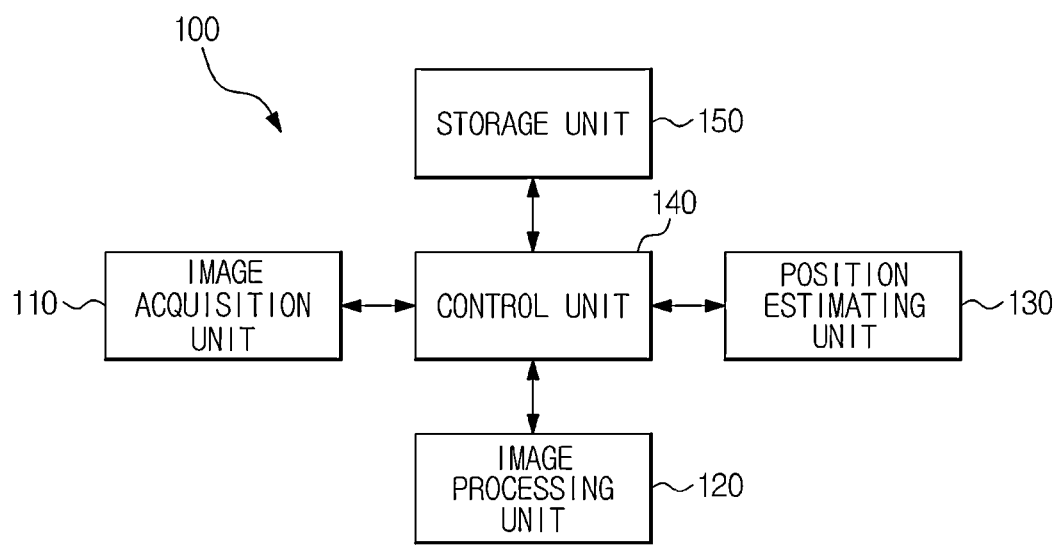
FIG. 2 is a control block diagram illustrating the robot position estimating apparatus in accordance with an embodiment of the present disclosure.
Figure 3:
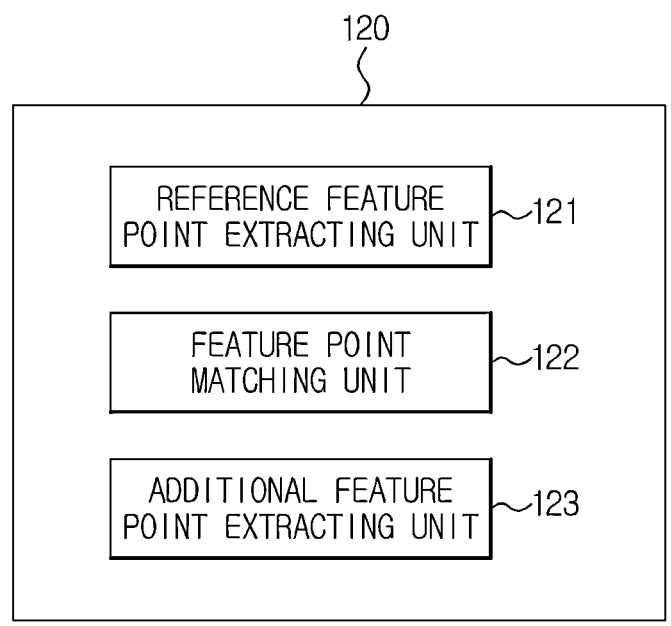
FIG. 3 is a detailed block diagram of an image processing unit of the robot position estimating apparatus in accordance with an embodiment of the present disclosure.
Figure 4A:
FIG. 4A is a view illustrating an example of a reference image or an object image that is acquired from a sensor of the robot position estimating apparatus in accordance with an embodiment of the present disclosure.
Figure 4B:
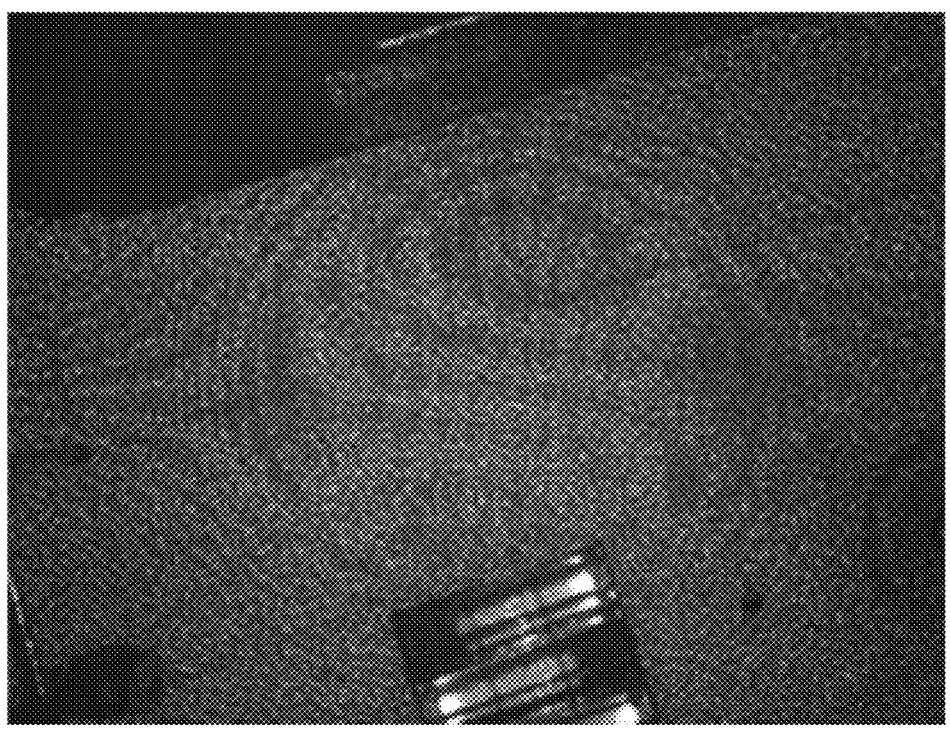
FIG. 4B is a view illustrating an example of an infrared image that is acquired from a sensor of the robot position estimating apparatus in accordance with an embodiment of the present disclosure.

FIG. 2 is a control block diagram illustrating the robot position estimating apparatus in accordance with an embodiment of the present disclosure. FIG. 3 is a detailed block diagram of an image processing unit of the robot position estimating apparatus in accordance with an embodiment of the present disclosure. FIG. 4A is a view illustrating an example of a reference image or an object image that is acquired from a sensor of the robot position estimating apparatus in accordance with an embodiment of the present disclosure. FIG. 4B is a view illustrating an example of an infrared image that is acquired from a sensor of the robot position estimating apparatus in accordance with an embodiment of the present disclosure.

The robot position estimating apparatus 100 may include an image acquisition unit 110, an image processing unit 120, a position estimating unit 130, a control unit 140, and a storage unit 150.

The image acquisition unit 110 may acquire a reference image, and then acquire an object image.

The reference image represents an image serving as a reference to extract feature points, and the object image represents an image that is to be compared with the reference image when extracting the feature points.

The image acquisition unit 110 may include a camera sensor (not shown), an infrared sensor (not shown), and a signal processing unit (not shown).

The camera sensor is configured to acquire a color image, such as an RGB image, for example, and the infrared sensor is configured to acquire a depth image, such as an infrared image including depth information, for example. The signal processing unit, by matching the RGB image acquired from the camera sensor to the infrared image, may generate a three-dimensional reference image and a three-dimensional object image, each including depth information.

The image acquisition unit 110 may be a three-dimensional vision sensor, for example, a time of flight (TOF) camera and a structured light camera, that are configured to acquire a three-dimensional image of various objects adjacent to the robot, for example, an obstacle or a wall, in real time.

For example, the three-dimensional vision sensor may be implemented as an RGB-D camera, and the RGB-D camera may include a portion to receive a color image and a portion to receive a range image. The portion to receive a color image may be composed of a general CMOS imaging sensor. The RGB-D camera may use infrared structured light to obtain the range information. To this end, the RGB-D camera may be composed of an infrared projector to project infrared light, and a black/white CMOS imaging sensor to sense the infrared light.

The image acquisition unit 110 may be provided in information technology (IT) devices such as game consoles, mobile phones, and smart phones, in addition to an intelligent robot.

Referring to FIG. 3, the image processing unit 120 may include a reference feature point extracting unit 121, a feature point matching unit 122, and an additional feature point extracting unit 123.

The reference feature point extracting unit 121 may extract two-dimensional reference feature points from the reference image or the object image by use of a reference feature point extracting algorithm. The reference feature point refers to coordinates in the reference image or in the object image.

The reference feature point extracting unit 121 may use a reference feature point extracting algorithm such as a Speed Up Robust Features (SURF) algorithm, Harris Corner Detection, and Scale Invariant Feature Transform (SIFT) algorithm, for example.

However, the reference feature point extracting algorithm in accordance with the present disclosure may be the SURF algorithm. As a descriptor to describe the reference feature point, a SURF descriptor may be used.

Because the SURF algorithm provides a high processing speed, the feature points are rapidly extracted, so that the position estimation of the robot may be achieved in real time.

Hereinafter, a method of extracting reference feature points will be described in detail.

The reference feature point extracting unit 121 generates an integral image from the reference image or from the object image, and calculates the sum of brightness with respect to each pixel included in a rectangular area.

The reference feature point extracting unit 121 obtains a reference feature point vector identified with a precise position from the integral image.

Thereafter, the reference feature point extracting unit 121 obtains a descriptor vector by use of the integral image of the reference image or the object image, and the reference feature point vector.

The image processing unit 120 matches the reference feature points of the reference image to the reference feature points of the object image.

The feature point matching unit 122 may determine whether the reference feature point of the reference image is the same as the reference feature point of the object image by comparing the reference feature point of the reference image with the reference feature point of the object image.

For example, the feature point matching unit 122 may calculate the distance between descriptor vectors by comparing a random descriptor vector of the reference image with a plurality of descriptor vectors of the object image, and obtain a pair of descriptor vectors matched that has a minimum distance therebetween.

In this case, the reference feature point matched correctly may be referred to as a matched reference feature point (inlier).

The additional feature point extracting unit 123 serves to extract at least one additional three-dimensional feature point from a three-dimensional image transmitted from the image acquisition unit 110, the at least one additional feature point located adjacent to the matched two-dimensional reference feature point.

Because pixels of the three-dimensional image have depth information, the additional feature point extracting unit 123 may extract at least one additional feature point located adjacent to the matched reference feature point.

For example, the additional feature point extracting unit 123 may extract four additional feature points located adjacent to the matched reference feature point or eight additional feature points located adjacent to the matched reference feature point.

The additional feature points extracting unit 123 may include a determination unit (not shown) to determine whether to extract additional feature points or to select the number of additional feature points to be extracted.

For example, the determination unit (not shown) may determine whether to extract additional feature points by comparing the number of matched reference feature points with a first reference value, or may select the number of additional feature points to be extracted, by comparing the number of matched reference feature points with a second reference value. The first reference value may be expressed as $MAX\_N_{IF}$, and the second reference value may be expressed as $MIN\_N_{IF}$.

Referring to FIG. 4A, the wall surface or the ceiling lack feature points, so the number of reference feature points available for extraction is significantly small, thereby causing a difficulty in calculating the position of the robot.

Meanwhile, the infrared image shown on FIG. 4B has a large number of points that are not observed on FIG. 4A.

Each of these points includes depth information, and may be extracted as an additional feature point.

In addition, the distance between the additional feature point of the reference image and the additional feature point of the object image is short, so the additional feature point of the reference image and the additional feature point of the object image may be recognized as being matched to each other.

That is, according to the robot position estimating apparatus 100 of the present disclosure, additional feature points are further extracted in addition to reference feature points, so that the position of the robot is estimated using more feature points, thereby improving the performance of the robot position estimating apparatus 100.

The position estimating unit 130 may estimate the position of the robot by use of the reference feature point and the at least one additional feature point.

In this case, in order to calculate the position of the robot, various algorithms may be used. For example, the position estimating unit 130 in accordance of the present disclosure may perform the calculation by use of RANdom Sample Consensus (RANSAC).

Herein, the calculation of position of the robot may be referred to as calculating the displacement from the position of the robot in photographing the reference image to the position of the robot in photographing the object image.

In this case, the displacement of the robot in a three-dimensional space may be obtained through the following mathematical formula 1:

$$\min_{R,d} \sum_{i=1}^{n} \|RX_i + d - Y_i\|^2 \quad \text{[Mathematical Formula 1]}$$

In the mathematical formula 1, R refers to a three-dimensional rotation matrix of a camera sensor, $X_i$ refers to a set of feature points of a reference image, $Y_i$ refers to a set of feature points of an object image, and d refers to a translation matrix. R and d that minimize the mathematical formula are obtained.

The position estimating unit 130 may estimate the position of the robot by use of the displacement of the robot. A method of calculating the robot may be implemented using various numerical methods.

For example, Singular Value Decomposition (SVD) may be used as the numerical method of the present disclosure in terms of the calculation speed.

The position estimating unit 130 may further include an optimization unit (not shown), and the optimization unit may optimize the position of the robot by use of R and d in the mathematical formal 1.

For example, the optimization unit may optimize the position of the robot by use of Sparse Bundle Adjustment (SBA) that is generally used, but the optimization in accordance with the present disclosure is not limited thereto. The optimization may be implemented in other algorithms.

The control unit 140 may perform an overall control over the robot position estimating apparatus 100.

For example, the control unit 140 may update the reference image when a new input image (a new object image) is obtained from the image acquisition unit 110.

In this case, the new input image becomes a new object image, and the original object image becomes a new reference image that is updated.

The storage unit 150 may store the reference feature points of the reference image, the reference feature points of the object image, and the matched reference feature points that are used to recognize the position of the robot.

In addition, the storage unit 150 may store the additional feature points of the reference image and the additional feature points of the object image.

Figure 5:
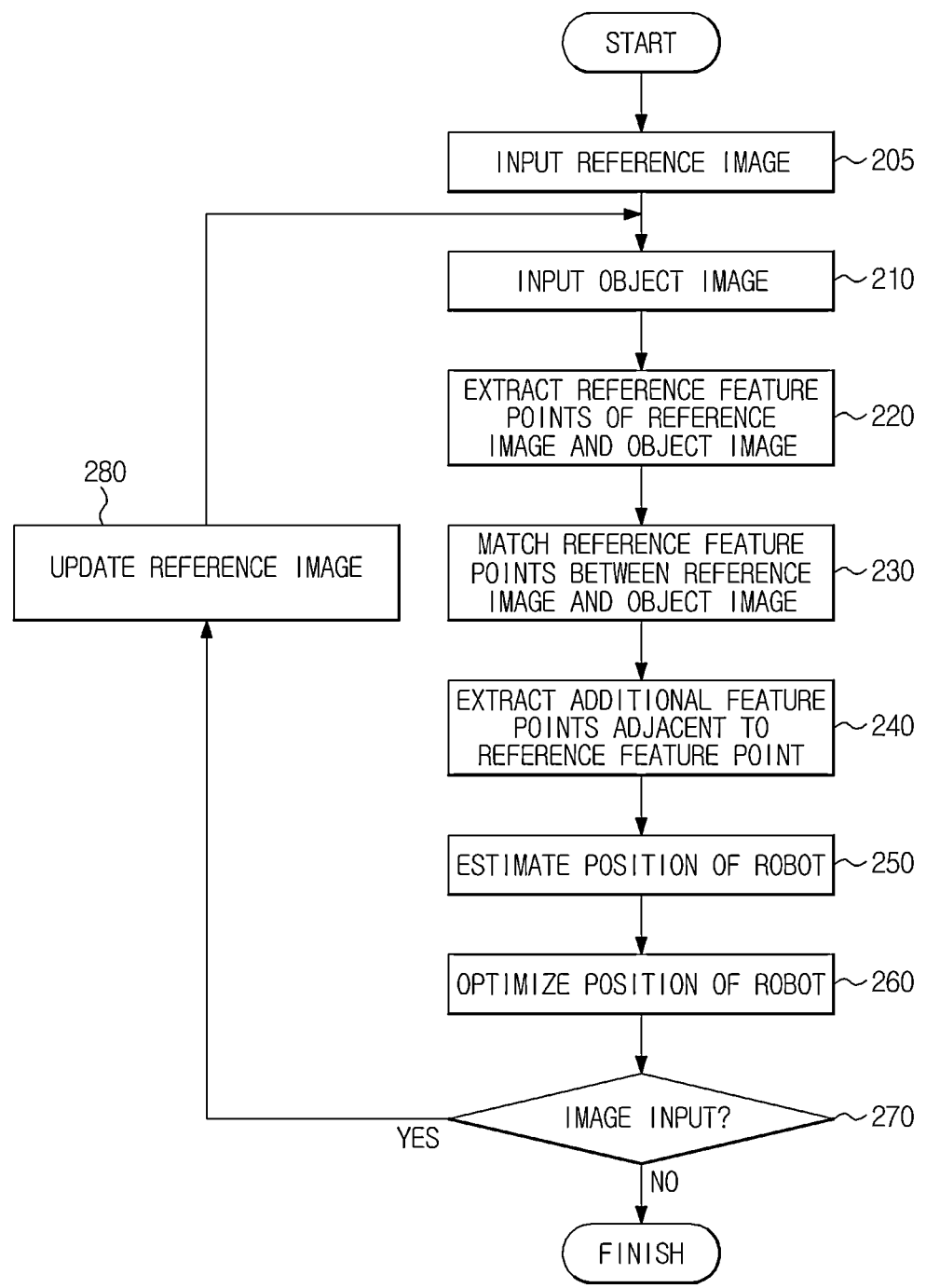
FIG. 5 is a control flow chart illustrating the robot position recognition of the robot position estimating apparatus in accordance with an embodiment of the present disclosure.

FIG. 5 is a control flow chart illustrating the robot position recognition of the robot position estimating apparatus in accordance with an embodiment of the present disclosure. Hereinafter, the description will be made with reference to FIG. 5 in conjunction with FIGS. 2 and 3.

The image acquisition unit 110 receives a reference image (205), and then an object image (210).

The reference image may be an image serving as a reference to extract feature points, and the object image may be an image to be compared with the reference image with regard to extracting feature points.

The image acquisition unit 110 includes a camera sensor (not shown), an infrared sensor (not shown), and a signal processing unit (not shown).

The camera sensor is configured to acquire a color image, such as an RGB image, for example, and the infrared sensor is configured to acquire a depth image, such as an infrared image including depth information, for example. The signal processing unit, by matching the RGB image acquired from the camera sensor to the infrared image, generates a three-dimensional reference image and a three-dimensional object image, each including depth information.

The image acquisition unit 110 may be a three-dimensional vision sensor, including a time of flight (TOF) camera and a structured light camera, that are configured to acquire a three-dimensional image of various objects adjacent to the robot, for example, an obstacle or a wall, in real time.

For example, the three-dimensional vision sensor may be implemented as an RGB-D camera, and the RGB-D camera may include a portion to receive a color image and a portion to receive a range image. The portion to receive a color image may be composed of a general CMOS imaging sensor. The RGB-D camera may use infrared structured light to obtain the range information. To this end, the RGB-D camera may be composed of an infrared projector to project infrared light, and a black/white CMOS imaging sensor to sense the infrared light.

The image acquisition unit 110 may be provided at information technology (IT) devices such as game consoles, mobile phones, and smart phones, in addition to an intelligent robot.

The image processing unit 120 extracts reference feature points from the reference image and the object image (220).

The reference feature point extracting unit 121 may extract two-dimensional reference feature points from the reference image or from the object image by use of a reference feature point extracting algorithm. The reference feature point refers to coordinates in the reference image or in the object image.

The reference feature point extracting unit 121 may use a reference feature point extracting algorithm such as a Speed Up Robust Features (SURF) algorithm, Harris Corner Detection, and Scale Invariant Feature Transform (SIFT) algorithm, for example.

However, the reference feature point extracting algorithm in accordance with the present disclosure may be the SURF algorithm. As a descriptor to describe the reference feature point, a SURF descriptor may be used.

Because the SURF algorithm provides a high processing speed, the feature points are rapidly extracted, so that the position estimation of the robot may be achieved in real time.

Hereinafter, a method of extracting reference feature points will be described in detail.

The reference feature point extracting unit 121 generates an integral image from the reference image or from the object image, and calculates the sum of brightness with respect to each pixels of a rectangular area.

The reference feature point extracting unit 121 obtains a reference feature point vector identified with the precise position from the integral image.

Thereafter, the reference feature point extracting unit 121 obtains a descriptor vector by use of the integral image of the reference image or the object image, and the reference feature point vector.

The image processing unit 120 matches the reference feature points of the reference image to the reference feature points of the object image (230).

The feature point matching unit 122 may determine whether the reference feature point of the reference image is the same as the reference feature point of the object image by comparing the reference feature point of the reference image with the reference feature point of the object image.

For example, the feature point matching unit 122 calculates the distance between descriptor vectors by comparing a random descriptor vector of the reference image with a plurality of descriptor vectors of the object image, and obtain a pair of descriptor vectors matched that has a minimum distance therebetween.

In this case, the reference feature point matched correctly may be referred to as a matched reference feature point (inlier).

The image processing unit 120 extracts additional feature points located adjacent to the matched reference feature point (240).

The additional feature point extracting unit 123 serves to extract at least one additional three-dimensional feature point from a three-dimensional image transmitted from the image acquisition unit 110, the at least one additional feature points located adjacent to the matched two-dimensional reference feature point.

Because pixels of the three-dimensional image have depth information, the additional feature point extracting unit 123 may extract at least one additional feature point located adjacent to the matched reference feature point.

For example, the additional feature point extracting unit 123 may extract four additional feature points located adjacent to the matched reference feature point or eight additional feature points located adjacent to the matched reference feature point.

The additional feature points extracting unit 123 may include a determination unit (not shown) to determine whether to extract additional feature points or to select the number of additional feature points to be extracted.

For example, the determination unit (not shown) may determine whether to extract additional feature points by comparing the number of matched reference feature points with a first reference value, or may select the number of additional feature points to be extracted, by comparing the number of matched reference feature points with a second reference value. The first reference value may be expressed as MAX_$N_{IF}$, and the second reference value may be expressed as MIN_$N_{IF}$.

Referring to FIG. 4A, the wall surface and the ceiling lack feature points, so the number of reference feature points available for extraction is significantly small, thereby causing a difficulty in calculating the position of the robot.

Meanwhile, the infrared image shown on FIG. 4B has a large number of points that are not observed on FIG. 4A.

Each of the points includes depth information, and may be extracted as an additional feature point.

In addition, the distance between the additional feature point of the reference image and the additional feature point of the object image is short, so the additional feature point of the reference image and the additional feature point of the object image may be regarded as being matched to each other.

That is, according to the robot position estimating apparatus 100 of the present disclosure, additional feature points are further extracted in addition to reference feature points, so that the position of the robot is estimated using more feature points, thereby improving the performance of the robot position estimating apparatus 100.

Hereafter, the extraction of the additional feature points will be described with reference to FIGS. 6 to 8B in detail.

The position estimating unit 130 estimates the position of the robot (250).

The position estimating unit 130 may estimate the position of the robot by use of the reference feature point and the at least one additional feature point.

In this case, in order to calculate the position of the robot, various algorithms may be used. For example, the position estimating unit 130 in accordance of the present disclosure may perform the calculation by use of RANdom Sample Consensus (RANSAC).

Herein, the calculation of position of the robot may be referred to as calculating the displacement from the position of the robot in photographing the reference image to the position of the robot in photographing the object image.

In this case, the displacement of the robot in a three-dimensional space may be obtained through the following mathematical formula 1 (repeated from above for convenience):

$$\min_{R,d} \sum_{i=1}^{n} \|RX_i + d - Y_i\|^2 \qquad \text{[Mathematical Formula 1]}$$

In the mathematical formula 1, R refers to a three-dimensional rotation matrix of a camera sensor, $X_i$ refers to a set of feature points of a reference image, $Y_i$ refers to a set of feature points of an object image, and d refers to a translation matrix. R and d that minimize the mathematical formula are obtained.

The position estimating unit 130 may estimate the position of the robot by use of the displacement of the robot. A method of calculating the robot may be implemented using various numerical methods.

For example, Singular Value Decomposition (SVD) may be used as the numerical method of the present disclosure in terms of the calculation speed.

The position estimating unit 130 optimizes the position of the robot (260).

The position estimating unit 130 may further include an optimization unit (not shown), and the optimization unit may optimize the position of the robot by use of R and d in the mathematical formal 1.

For example, the optimization unit may optimize the position of the robot by use of Sparse Bundle Adjustment (SBA) that is generally used, but the optimization in accordance with the present disclosure is not limited thereto. The optimization may be implemented in other algorithms.

The control unit 140 updates the reference image (270) when a new input image (a new object image), is obtained from the image acquisition unit, and repeats the process including operations 210 to 280 (280).

In this case, the new input image becomes a new object image, and the original object image becomes a new reference image that is updated.

Figure 6:
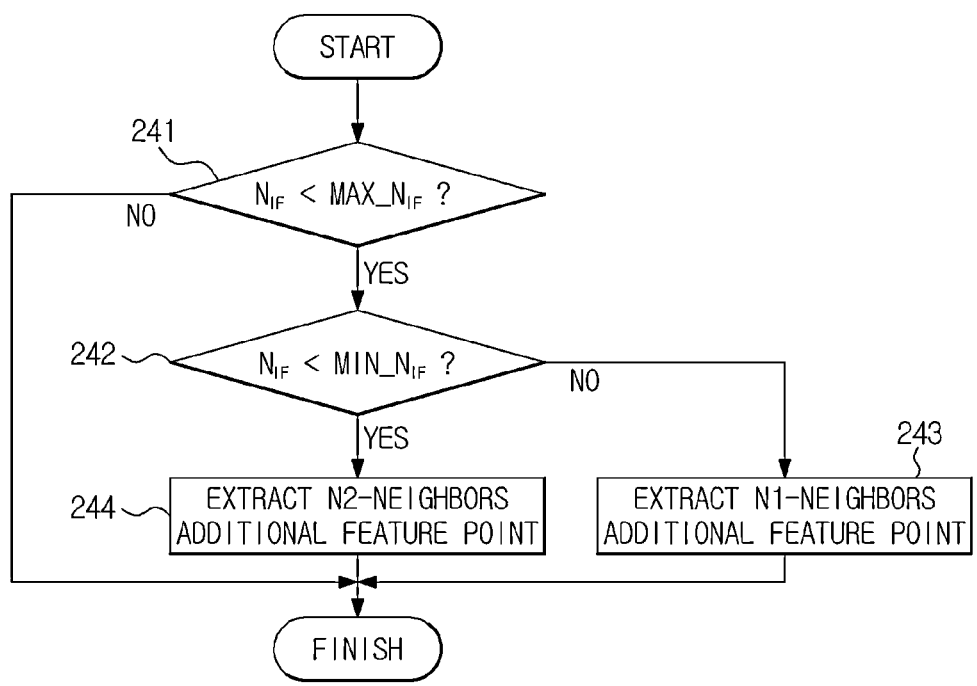
FIG. 6 is a control flow chart illustrating the extraction of additional feature points of the robot position estimating apparatus in accordance with an embodiment of the present disclosure.

FIG. 6 is a control flow chart illustrating the extraction of additional feature points of the robot position estimating apparatus in accordance with an embodiment of the present disclosure.

In FIG. 6, $N_{IF}$ refers to the number of matched reference feature points. MAX_$N_{IF}$ refers to the maximum number of matched reference feature points that require additional feature points. That is, MAX_$N_{IF}$ may serve as a reference to determine whether to extract additional feature points.

MIN_$N_{IF}$ refers to the number of matched reference feature points that require n2-neighbor additional feature points, for example, MIN_$N_{IF}$ may be 10. That is, MIN_$N_{IF}$ may serve as a reference to select the number of additional feature points to be extracted.

In FIG. 6, the additional feature point extracting unit 123 performs comparison whether the number of matched reference feature points is smaller than MAX_$N_{IF}$, for example, MAX_$N_{IF}$=50 (241).

If the number of matched reference feature points is equal to or larger than MAX_$N_{IF}$, for example, MAX_$N_{IF}$=50, additional feature points do not need to be extracted. As such, a sufficient amount of matched reference feature points needed for the position recognition is already obtained, the performance with regard to calculating the position of the robot is ensured.

Meanwhile, if the number of matched reference feature points is smaller than MAX_$N_{IF}$, the additional feature point extracting unit 123 performs comparison whether $N_{IF}$ is smaller than MIN_$N_{IF}$ (242).

If $N_{IF}$ is equal to or greater than MIN_$N_{IF}$, for example, MIN_$N_{IF}$=10, the additional feature point extracting unit 123 extracts n1-neighbor additional feature points (243).

n1 is a natural number smaller than n2. Because as many feature points are generated as the matched reference feature point x n1, the position estimating unit 130 may stably estimate the position of the robot.

Meanwhile, if $N_{IF}$ is smaller than MIN_$N_{IF}$, for example, MIN_$N_{IF}$=10, the additional feature point extracting unit 123 extracts n2-neighbor additional feature points (244)

The position estimating unit 130 may not measure the position of the robot in a stable manner only with the matched reference feature points, so additional feature points need to be provided such that the position estimating unit 130 may stably estimate the position of the robot.

In a case that additional feature points are extracted by the additional feature point extracting unit 123 in a manner of n2-neigherbors, as many feature points are generated as the matched reference feature point x n2, so that the position estimating unit 130 may stably estimate the position of the robot based on the generated additional feature points.

For example, in FIG. 6, the additional feature point extracting unit 123 may have n1=4, n2=8. In this case, n1 and n2 are natural numbers, and n2 is larger than n1.

Figure 7A:
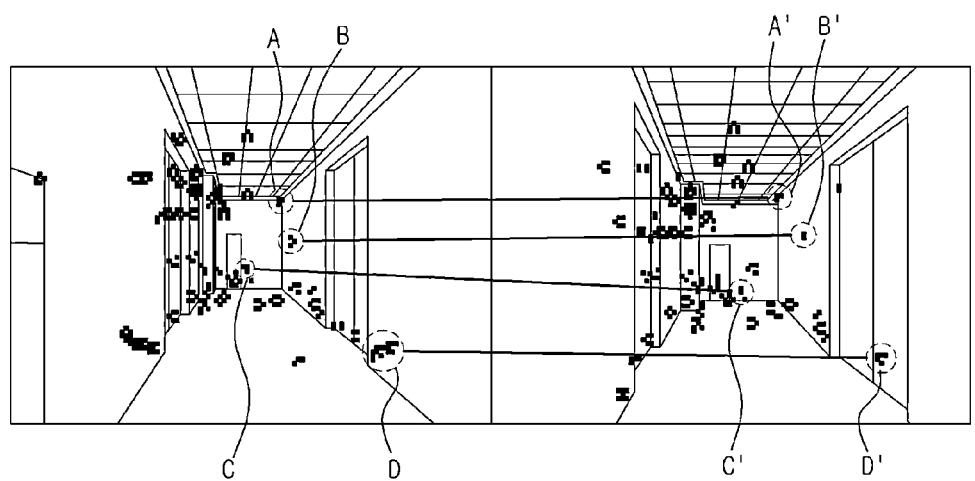
FIG. 7A is a view illustrating an example of the matching of feature points between two images each acquired by the robot position estimating apparatus at similar positions of a corridor environment.
Figure 7B:
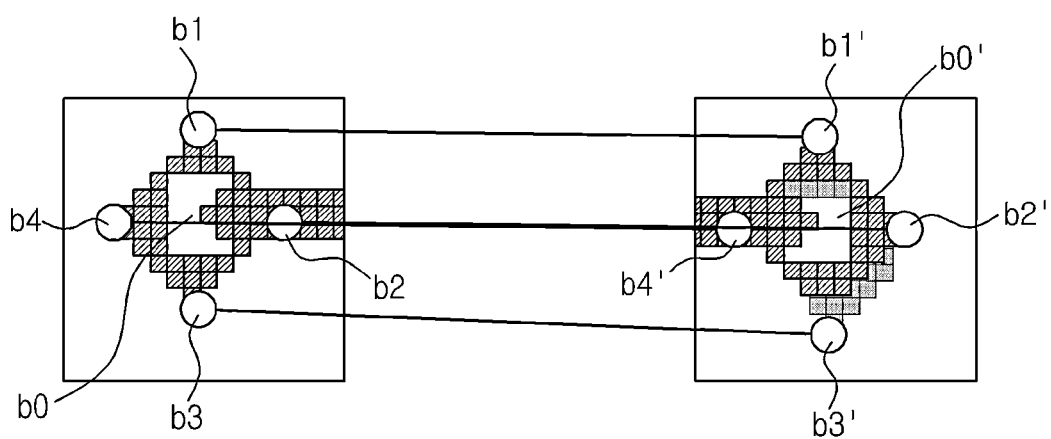
FIG. 7B is a view illustrating an example of the extraction and the matching of additional feature points (4-neightbors) at the robot position estimating apparatus in accordance with an embodiment of the present disclosure.

FIG. 7A is a view illustrating an example of the matching of the feature points between two images each acquired by the robot position estimating apparatus at similar positions in a corridor environment. FIG. 7B is a view illustrating an example of the extraction and the matching of additional feature points (4-neighbors) at the robot position estimating apparatus in accordance with an embodiment of the present disclosure.

Referring to FIG. 7A, a first reference feature point (A), a second reference feature point (B), a third reference feature point (C), and a fourth reference feature point (D) of the reference image are shown. In addition, a first reference feature point (A'), a second reference feature point (B'), a third reference feature point (C'), and a fourth reference feature point (D') of the object image are shown.

The first reference feature point (A) of the reference image may be matched to the first reference feature point (A') of the object image. Similarly, the second reference feature point (B), the third reference feature point (C), and the fourth reference feature point (D) of the reference image may be matched to the second reference feature point (B'), the third reference feature point (C'), and the fourth reference feature point (D') of the object image, respectively.

Referring to FIG. 7B, additional feature points extracted at an adjacent area of the second reference feature point (B) of the reference image and additional feature points extracted at an adjacent area of the second reference feature point (B') of the object image are shown.

With respect to the coordinate (b0) of the second reference feature point (B) of the reference image, a first additional feature point (b1), a second additional feature point (b2), a third additional feature point (b3), and a fourth additional feature point (b4) are extracted from an upper side, a right side, a lower side, and a left side, respectively.

With respect to the coordinate (b0') of the second reference feature point (B') of the object image, a first additional feature point (b1'), a second additional feature point (b2'), a third additional feature point (b3'), and a fourth additional feature point (b4') are extracted from an upper side, a right side, a lower side, and a left side, respectively.

Because each distance between the additional feature points (b1 to b4) of the reference image and the additional feature points (b1' to b4') of the object image is small, the additional feature points (b1 to b4) of the reference image and the additional feature points (b1' to b4') of the object image are regarded as being matched. That is, the first additional feature point (b1) of the reference image is assumed as being matched to the first additional feature point (b1') of the object image, and similarly the second, third, and fourth additional feature points (b2, b3, and b4) of the reference image are assumed as being matched to the second, third, and fourth additional feature points (b2', b3', and b4') of the object image, respectively.

Figure 8A:
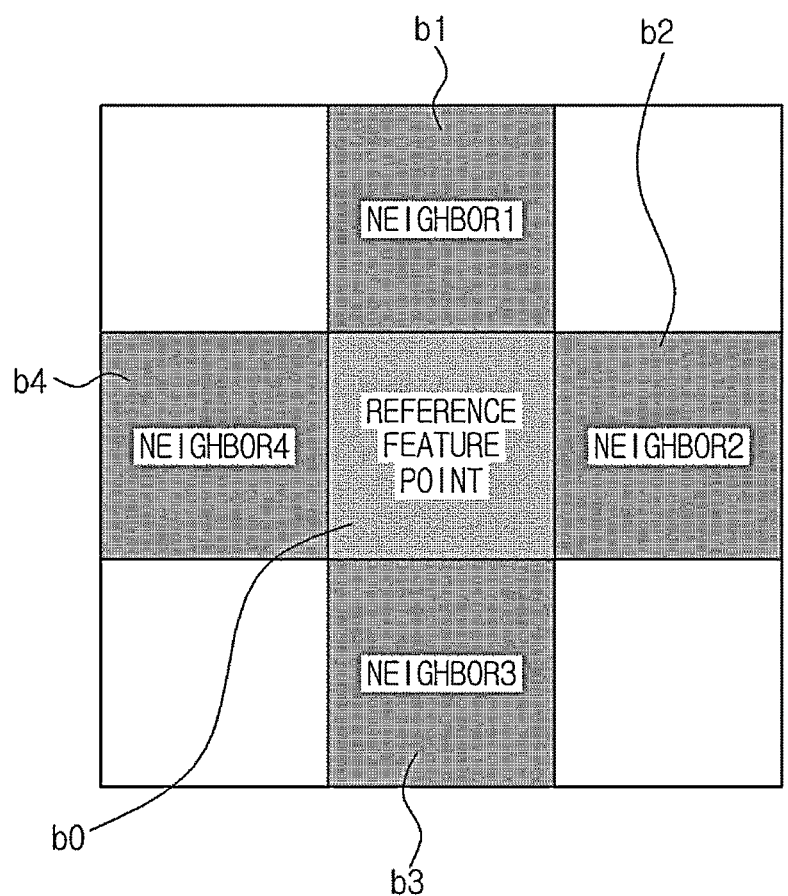
FIG. 8A is a conceptual view illustrating the extraction of additional feature points (4-neightbors) adjacent to a reference point of the robot position estimating apparatus in accordance with an embodiment of the present disclosure.

FIG. 8A is a conceptual view illustrating the extraction of additional feature points (4-neightbors) adjacent to a reference point of the robot position estimating apparatus in accordance with an embodiment of the present disclosure.

The additional feature point extracting unit 123 may extract the additional feature points (b1, b2, b3, and b4) from an upper side, a right side, a lower side, and a left side of the reference feature point (b0) at an adjacent area of the reference feature point (b0). The extracted additional feature points (b1 to b4) each include depth information.

Figure 8B:
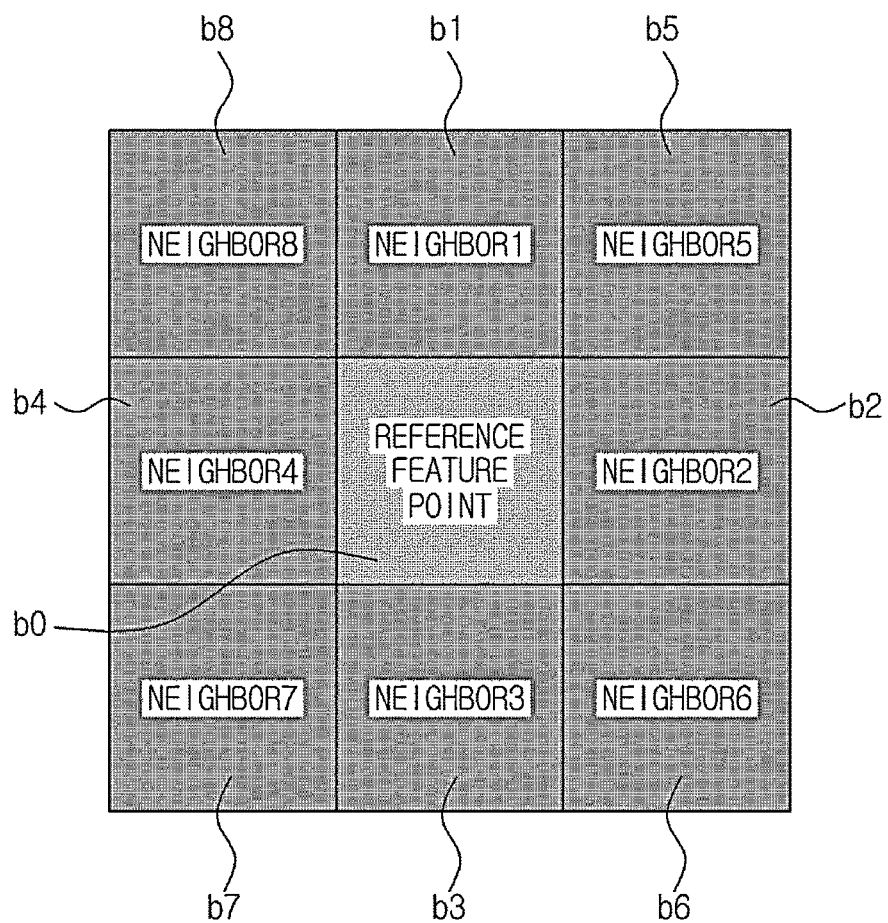
FIG. 8B is a conceptual view illustrating the extraction of additional feature points (8-neightbors) adjacent to a reference point of the robot position estimating apparatus in accordance with an embodiment of the present disclosure.

FIG. 8B is a conceptual view illustrating the extraction of additional feature points (8-neightbors) adjacent to a reference point of the robot position estimating apparatus in accordance with an embodiment of the present disclosure.

The additional feature point extracting unit 123 may extract the additional feature points (b1, b2, b3, and b4) from an upper side, a right side, a lower side, and a left side of the reference feature point (b0) at an adjacent area of the reference feature point (b0). In addition, the additional feature point extracting unit 123 may extract additional feature points (b5, b6, b7, and b8) from an upper right side, a lower right side, a lower left side, and an upper left side of each reference feature point. The extracted additional feature points (b1 to b8) each include depth information.

Referring to FIGS. 8A or 8B, the number of additional feature points, which is increased as n-neighbor additional feature points, corresponds to n×(matched reference feature points.

In addition, the additional feature point extracting unit 123 may extract additional feature points from a random position with respect to the reference feature point.

FIG. 9 is a view showing the comparison result of the performance between the conventional position recognition method and the suggested method in accordance with an embodiment of the present disclosure.

Referring to FIG. 9, for estimation of the position of the robot through the conventional robot position estimation method, the number of feature points is 20, and the number of inliers is 14 among the feature points and the translation error value is (0.26, −0.58, 1.06).

Referring to FIG. 9, for estimation of the position of the robot through the suggested method, the number of feature points is 180, and the number of inliers is 128 among the feature points and the translation error value is (−0.03, 0, −0.07).

That is, when compared the position recognition performance between the conventional method and the suggested method, the suggest method produces a larger number of feature points and inliers than the conventional method, and produces smaller errors.

Accordingly, the suggested method enables a real time position recognition in a stable manner in an indoor environment where the feature point information is insufficient.

The above-described embodiments may be recorded in computer-readable media including program instructions to implement various operations embodied by a computer. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors. The computer-readable media may also be embodied in at least one application specific integrated circuit (ASIC) or Field Programmable Gate Array (FPGA), which executes (processes like a processor) program instructions. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An apparatus for estimating a position of a robot, the apparatus comprising:
a processor comprising:
an image acquisition unit configured to acquire an RGB image and an infrared image having depth information, and sequentially generate a reference image serving as a reference to extract feature points and an object image that is to be compared with the reference image by matching the RGB image to the infrared image;
an image processing unit configured to extract two-dimensional reference feature points from each of the reference image and the object image, match the reference feature points between the reference image and the object image as matched two-dimensional reference feature points, and extract at least one additional three-dimensional feature point from the matched two-dimensional reference feature points; and
a position estimating unit configured to estimate the position of the robot from the at least one additional three-dimensional feature point and optimize the estimated position of the robot.

2. The apparatus of claim 1, wherein the at least one additional three-dimensional feature point is coordinate information that is located adjacent to a matched two-dimensional reference feature point of the matched two-dimensional reference feature points, and has depth information.

3. The apparatus of claim 1, wherein the at least one additional three-dimensional feature point comprises four additional feature points or eight additional feature points extracted for each of the matched two-dimensional reference feature points.

4. The apparatus of claim 1, wherein the image processing unit comprises:
a reference feature point extracting unit configured to extract the two-dimensional reference feature points from the reference image or the object image by use of a reference feature point extraction algorithm;
a feature point matching unit configured to match a reference feature point of the reference image to a reference feature point of the object image to determine whether the reference feature point of the reference image is a same feature point as the reference feature point of the object image; and
an additional feature point extracting unit configured to extract the at least one additional three-dimensional feature point located adjacent to a matched two-dimensional reference feature point of the matched two-dimensional reference feature points from a three-dimensional image that is transmitted from the image acquisition unit.

5. The apparatus of claim 4, wherein the additional feature point extracting unit comprises a determination unit configured to determine whether to extract the at least one additional three-dimensional feature point, or to select the number of the at least one additional three-dimensional feature point to be extracted.

6. The apparatus of claim 5, wherein the determination unit determines whether to extract the at least one additional three-dimensional feature point by comparing the number of the matched two-dimensional reference feature points with a first reference value.

7. The apparatus of claim 5, wherein the determination unit selects the number of the at least one additional three-dimensional feature point to be extracted, by comparing the number of the matched two-dimensional reference feature points with a second reference value.

8. The apparatus of claim 1, wherein the position estimating unit obtains a displacement of the robot in a three-dimensional space by use of the following mathematical formula:

$$\min_{R,d} \Sigma_{i=1}^{n} \|RX_i + d - Y_i\|^2.$$

9. A method of estimating a position of a robot, the method comprising:

acquiring an RGB image and an infrared image having depth information, and sequentially generating a reference image serving as a reference to extract feature points and an object image that is to be compared with the reference image by matching the RGB image to the infrared image;

extracting two-dimensional reference feature points from each of the reference image and the object image, matching the reference feature points between the reference image and the object image as matched two-dimensional reference feature points, and extracting at least one additional three-dimensional feature point from the matched two-dimensional reference feature points to perform an image processing; and estimating the position of the robot from the at least one additional three-dimensional feature point and optimizing the estimated position of the robot.

10. The method of claim 9, wherein the at least one additional three-dimensional feature point is coordinate information that is located adjacent to a matched two-dimensional reference feature point of the matched two-dimensional reference feature points, and has depth information.

11. The method of claim 9, wherein the at least one additional three-dimensional feature point comprises four additional feature points or eight additional feature points extracted for each of the matched two-dimensional reference feature points.

12. The method of claim 9, wherein the performing of image processing comprises:

extracting the two-dimensional reference feature points from the reference image or the object image by use of a reference feature point extraction algorithm;

determining whether a reference feature point of the reference feature points of the reference image is a same feature point as a reference feature point of the reference feature points of the object image by matching the reference feature point of the reference image to the reference feature point of the object image; and extracting the at least one additional three-dimensional feature point located adjacent to the matched reference feature point from a three-dimensional image that is transmitted from an image acquisition unit.

13. The method of claim 12, wherein the extracting of the at least one additional three-dimensional feature point comprises:

performing a determination of whether to extract the at least one additional three-dimensional feature point or of selecting the number of the at least one additional three-dimensional feature point to be extracted.

14. The method of claim 13, wherein the performing of the determination comprises comparing the number of the matched two-dimensional reference feature points with a first reference value.

15. The method of claim 13, wherein the performing of the determination comprises comparing the number of the matched two-dimensional reference feature points with a second reference value.

16. The method of claim 9, wherein the estimating of the position of the robot comprises obtaining a displacement of the robot in a three-dimensional space by use of the following mathematical formula:

$$\min_{R,d} \Sigma_{i=1}^{n} \|RX_i + d - Y_i\|^2.$$

17. A non-transitory computer-readable recording medium storing a program to implement the method of claim 9.

18. A location estimation method for a device, the method comprising:

receiving a color image;

receiving a depth image;

matching the color image to the depth image;

generating a three-dimensional reference image based on the matching;

generating a three-dimensional object image based on the matching;

extracting two-dimensional reference feature points from the three-dimensional reference image;

extracting two-dimensional reference feature points from the object image;

matching the extracted two-dimensional reference feature points from the three-dimensional reference image to the extracted two-dimensional reference feature points from the object image as matched two-dimensional reference feature points;

extracting at least one additional three-dimensional feature point using the matched two-dimensional reference feature points; and estimating the location of the device based on the at least one additional three-dimensional feature point.

19. The location estimation method of claim 18, wherein the color image comprises an RGB image.

20. The location estimation method of claim 18, wherein the depth image comprises an infrared image having depth information.

* * * * *